US012485904B2

United States Patent
Bálint et al.

(10) Patent No.: US 12,485,904 B2
(45) Date of Patent: Dec. 2, 2025

(54) VEHICLE TIRE AREA CONTROL

(71) Applicant: Volvo Car Corporation, Gothenburg (SE)

(72) Inventors: András Bálint, Gothenburg (SE); Ehsan Yasari, Gothenburg (SE); Mladen Gibanica, Gothenburg (SE); Ellen Petersson, Gothenburg (SE); Xin Zhang, Shanghai (CN); Shubhada Paresh Deshmukh, Gothenburg (SE); Sissela Magdalena Svärd, Gothenburg (SE); Björn Jesper Boberg, Gothenburg (SE); Ruben Almeida Ulisses De Carvalho Fonseca, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 116 days.

(21) Appl. No.: 18/533,772

(22) Filed: Dec. 8, 2023

(65) Prior Publication Data
US 2025/0187610 A1 Jun. 12, 2025

(51) Int. Cl.
*B60W 40/06* (2012.01)
*B60W 50/14* (2020.01)

(52) U.S. Cl.
CPC ............ *B60W 40/06* (2013.01); *B60W 50/14* (2013.01); *B60W 2050/146* (2013.01); *B60W 2552/00* (2020.02)

(58) Field of Classification Search
CPC .. B60W 40/06; B60W 50/14; B60W 2552/00; B60W 2050/146; G01W 1/02;
(Continued)

(56) References Cited

U.S. PATENT DOCUMENTS 6,470,266 B1 10/2002 Ito et al.
2002/0095253 A1* 7/2002 Losey .................. B60T 8/1725
701/82
(Continued)

FOREIGN PATENT DOCUMENTS

EP 3243671 A1 11/2017
EP 3581404 A1 12/2019
WO WO-2023110713 A1 * 6/2023 ........... B60C 11/243

OTHER PUBLICATIONS

Jiaming et al., "A Tire Pressure Monitoring System Based on Wireless Sensor Networks Technology," 2008, Publisher: IEEE.*
Yoshitomi, et al. "Entry detection apparatus and method for detecting an ingress", Semantic Scholar, May 3, 2016, 2 pages (abstract only).
"Stockholm—Studded Tyre Ban" Urban Access Regulations in Europe, https://urbanaccessregulations.eu/countries-mainmenu-147/sweden-mainmenu-248/stockholm-studded-tire-ban, Last Accessed Nov. 1, 2023, 5 pages.
(Continued)

Primary Examiner — Tuan C To
(74) Attorney, Agent, or Firm — Amin, Turocy & Watson, LLP

(57) ABSTRACT

Systems/techniques that facilitate determining suitability of tires for vehicle operation on a road are provided. In various embodiments, a system can detect road surface conditions and restrictions from road signs by external sensors. In various aspects, the system can determine attributes of vehicle tires by internal sensors. In various embodiments, the system can determine if a vehicle is suitable to drive on a road, based on the determined tire attributes, detected restrictions, and detected road surface conditions. Furthermore, the system can determine if a vehicle is suitable to drive on a road based on permit statuses of the vehicle or can determine potential fees that can accumulate from driving on a road with the determined tire attributes. In various instances, the system can initiate, in response to a determination that the vehicle is not suitable to drive on the road, an electronic notification on a vehicle display.

20 Claims, 11 Drawing Sheets

(58) Field of Classification Search
CPC . G08G 1/00; G08G 21/00; B60Q 9/00; B60Q 9/002; B60Q 9/008
USPC .......................................................... 701/1
See application file for complete search history.

(56) References Cited

U.S. PATENT DOCUMENTS

| | | | | |
|---|---|---|---|---|
| 2015/0344038 | A1* | 12/2015 | Stenneth | G07C 5/008 340/439 |
| 2016/0180707 | A1 | 6/2016 | Macneille et al. | |
| 2016/0349072 | A1 | 12/2016 | Yoshitomi et al. | |
| 2017/0334254 | A1* | 11/2017 | Limbrunner | B60W 40/12 |
| 2019/0219410 | A1 | 7/2019 | Burgess et al. | |
| 2022/0314970 | A1* | 10/2022 | Alspach | B60C 19/00 |
| 2022/0366787 | A1* | 11/2022 | Golov | G08G 1/0112 |
| 2024/0174032 | A1* | 5/2024 | Young | B60C 23/20 |
| 2024/0200968 | A1* | 6/2024 | Beaurepaire | G01C 21/3461 |

OTHER PUBLICATIONS

"Helsinki bans studed tyres on Lonnrotinkatu street" News From Finland Helsinki Times, https://www.helsinkitimes.fi/finland/finland-news/domestic/22269-helsinki-bans-studded-tyres-on-loennrotinkatu-street.html, Sep. 29, 2022, 5 pages.

"What Are Studded Winter Tires & Are They Legal in Canada?" Canad Drives, https://www.canadadrives.ca/blog/maintenance/what-are-studded-winter-tires-are-they-legal-in-canada, Last Accessed Nov. 1, 2023, 10 pages.

"Washington State Transportation Commission Studded Tire Fact Sheet" https://wstc.wa.gov/wp-content/uploads/2019/07/Studded-Tire-Fact-Sheet.pdf, Last Accessed Nov. 1, 2023, 2 pages.

"Studded tyre fee" https://www.oslo.kommune.no/english/street-transport-and-parking/studded-tyre-fee/#toc-1, Last Accessed Nov. 1, 2023, 4 pages.

* cited by examiner

VEHICLE TIRE AREA CONTROL

TECHNICAL FIELD

The subject disclosure relates generally to vehicle tire area control, and more specifically to determining suitability of tires for vehicle operation on a road.

BACKGROUND

Drivers can often be unaware of conditions of tires on their vehicle, and therefore be unaware if their vehicle is suitable to drive on a road. For example, a driver may be unaware or forget that the vehicle is equipped with winter tires when driving in non-snowy weather after a winter season. Moreover, drivers may be uninformed of which tires to use in particular road conditions, causing potential hazardous situations when driving. Furthermore, drivers can also be unaware of traffic laws relating to tires of a vehicle, especially if traffic laws are frequently changed or implemented. For example, countries have implemented restrictions or bans on studded tires. Studs are small spikes staggered and inserted on tread of a tire, typically used during icy or snowy weather to enhance traction of vehicle tires. Studded tires can promote safety while driving in such weather conditions. Information or updates on current restrictions of studs can be found on, for example, regional transportation websites. Restrictions or bans can also be observed on signs alongside roads. Similarly, restrictions or bans on snow chains have also been placed. Snow chains (e.g., tire chains) are devices fitted to tires of a vehicle to provide increased traction when driving in snow or ice by leveraging weight of the vehicle to dig into the snow or ice while driving. Restrictions on studs or snow chains are placed to prevent road damage or reduced traction when road conditions are not suited by studs or snow chains (e.g., dry roads), however drivers must manually and consistently check for updates on latest regulations. Drivers can also miss or not recognize signs detailing restrictions, especially if the driver is entering an area for the first time. Furthermore, regulations vary geographically (e.g., by country, by region, by city, by street) or depend on vehicle registrations (e.g., permits, payment status), which can cause confusion among drivers on if their vehicle is suitable to drive on particular roads.

Accordingly, systems or techniques that can address one or more of these technical problems can be desirable.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate determining tire suitability for vehicle operation are described.

According to an embodiment, a system, comprises a processor that executes computer-executable components stored in a non-transitory computer-readable memory, the computer-executable components comprising: a context component that determines conditions or restrictions associated with a road; and an analysis component that determines suitability for a vehicle to drive on the road based on attributes of tires of the vehicle.

According to an embodiment, a computer-implemented method, comprises: determining conditions or restrictions associated with a road; and determining suitability for a vehicle to drive on the road based on attributes of tires of the vehicle.

According to yet another embodiment, a computer program product comprises a non-transitory computer-readable memory having program instructions embodied therewith, the program instructions executable by a processor to cause the processor to: determine conditions or restrictions associated with a road; and determine suitability for a vehicle to drive on the road based on attributes of tires of the vehicle.

According to one or more embodiments, the above-described systems can be implemented as computer-implemented methods or computer program products.

DETAILED DESCRIPTION

Figure 1:
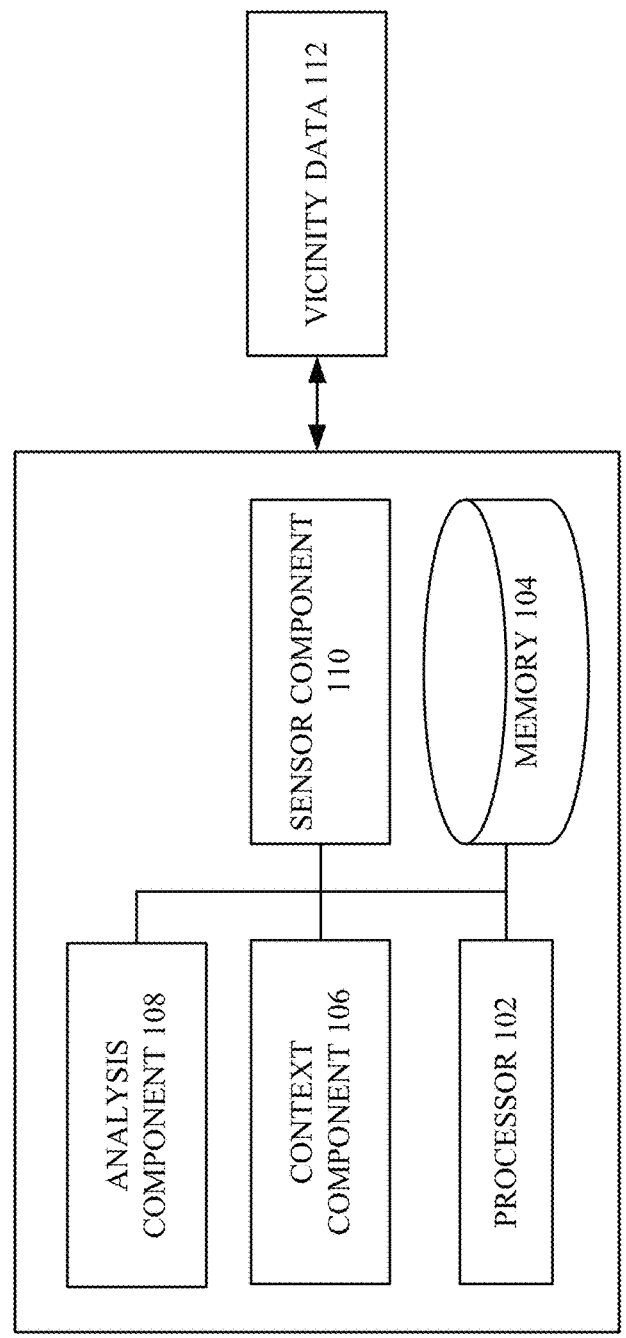
FIG. 1 illustrates a block diagram of an example, non-limiting system that facilitates determining suitability of tires for vehicle operation in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Restrictions or bans on vehicle tires on particular roads or regions are typically implemented to promote safety or maintain road surface quality. Drivers can be informed of such restrictions or bans related to vehicle tires, for example, by reading government transportation websites for information on road regulations or by being attentive to roadside signage that may indicate restrictions. Furthermore, aspects of vehicle tires (e.g., tread, studs, tire type, material) can affect suitability of driving on a road depending on road surface conditions. Drivers can learn if tires of a vehicle are suitable to drive on a road by considering weather conditions and manually observing current conditions of the tires of the vehicle.

Unfortunately, and as recognized by the inventors of various embodiments described herein, existing techniques for awareness of vehicle tire suitability on a road can be unreliable for various reasons.

First, the present inventors realized that many regions implement bans or restrictions on studded tires to minimize damage to road surfaces, however, drivers are typically unaware of such restrictions. Lack of awareness in studded tire regulations can lead to drivers unknowingly violating traffic laws or liability to pay violation fees. For example, countries have introduced bans on studded tires in specific regions of bigger cities. Similarly, tire chain restrictions or bans can be introduced to specific roads or regions. Moreover, restrictions or bans can be dependent on various other factors (e.g., stud type, tire type, chain type, permit or registration status, payment status), causing difficulty for drivers to know if they are in compliance with restrictions. For example, metal studs can be permitted in a state, but rubber studs can be prohibited in that state. As another example, a region can require a permit with additional fees to use studs on tires. As yet another example, location of where a vehicle is registered can affect compliance. Thus, a driver may be unaware if obtained registration applies to another region. Furthermore, restrictions can be time-dependent. For example, winter tires can be banned in a region during summer months when icy or snowy weather conditions are not present. Such complexity of tire restrictions can be challenging for drivers to comply with.

Second, the present inventors realized that drivers may be unaware of current conditions of tires on their vehicle (e.g., tread depth, tire type, tire material), presenting hazardous situations depending on road conditions. For example, a driver may be unaware that tread depth of the vehicle tires is shallow while driving on an icy road, and cause potential hazards (e.g., sliding, increased stopping distance, reduced traction, reduced handling) that may lead to an accident. Furthermore, drivers may forget to equip suitable tires for certain driving conditions. For example, a driver can forget to replace winter tires with summer tires on a vehicle when driving in summer weather, causing problems in tire performance (e.g., faster tire wear, reduced traction, reduced fuel efficiency, increased road noise, poor braking performance).

Third, the present inventors realized that restrictions or bans on vehicle tires can change, requiring drivers to actively and manually stay informed of such restrictions. For example, countries have recently implemented traffic law changes relating to studded tires on specific roads. Thus, to remain informed and avoid violation costs, drivers may be required to frequently check transportation websites or actively monitor road signs. Active monitoring can be time intensive and undesirable to drivers in various situations. For example, if a driver of a vehicle equipped with tire chains is following a navigation route but encounters a road sign indicating a ban on tire chains, the driver must discover an alternative navigation route or risk potential consequences of violating the ban (e.g., ticket, fines). Moreover, such inconveniences to or unawareness by drivers can lead to a frequency of drivers violating restrictions and damaging road surfaces.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate determining tire suitability for vehicle operation. That is, the present inventors realized that various disadvantages associated with existing techniques for driver awareness of tire suitability for vehicle operation on a road can be ameliorated by a vehicle tire area control system.

More specifically, a vehicle can be outfitted with various external sensors, such as road-facing cameras or road-facing microphones. In various aspects, the vehicle can utilize such external sensors to capture vicinity data of a vicinity of the vehicle (e.g., to capture pictures of roadways, to capture noises that occur in the vicinity of the vehicle). Furthermore, the vehicle can be outfitted with a deep learning neural network that can be trained or otherwise configured to detect road conditions based on data captured by the external sensors. Thus, in various instances, the vehicle can execute the deep learning neural network on the vicinity data. Furthermore, a vehicle can be equipped with internal sensors (e.g., pressure sensors, ultrasonic sensors, laser-based sensors) to monitor aspects of tires of a vehicle (e.g., tire pressure, tread depth).

Various embodiments described herein can be employed to use hardware or software to solve problems that are highly technical in nature (e.g., to facilitate vehicle tire area control), that are not abstract and that cannot be performed as a set of mental acts by a human. Further, some of the processes performed can be performed by a specialized computer (e.g., a deep learning neural network having internal parameters such as convolutional kernels) for carrying out defined tasks related to artificially intelligent vehicle operation.

It should be appreciated that the herein figures and description provide non-limiting examples of various embodiments and are not necessarily drawn to scale.

FIG. 1 illustrates a block diagram of an example, non-limiting system 100 that can facilitate determining suitability of tires for vehicle operation in accordance with one or more embodiments described herein.

In various embodiments, there can be a vehicle. In various aspects, the vehicle can be any suitable vehicle or automobile (e.g., can be a car, a truck, a van, a motorcycle). In various instances, the vehicle can have or otherwise exhibit any suitable type of propulsion system (e.g., can be an electric vehicle, can be a gasoline-powered or diesel-powered vehicle, can be a hybrid vehicle). In some cases, the vehicle can be driving on any road, street, lane, or highway at any speed. In other cases, the vehicle can, while driving, be stopped at an intersection, at a traffic light, at a stop sign, at a cross-walk, or at a traffic jam. In yet other cases, the vehicle can be parked rather than driving (e.g., can be parked in a parking lot, by a curb, or in a driveway). In any case, the vehicle can comprise, have, or otherwise be outfitted or equipped with the system 100. In other words, the system 100 can be onboard the vehicle. In some cases, because the vehicle can comprise the system 100, the vehicle can be considered as a smart vehicle.

In various embodiments, the system 100 can comprise a processor 102 (e.g., computer processing unit, microprocessor) and a non-transitory computer-readable memory 104 that is operably or operatively or communicatively connected or coupled to the processor 102. The non-transitory computer-readable memory 104 can store computer-executable instructions which, upon execution by the processor 102, can cause the processor 102 or other components of the system 100 (e.g., context component 106, analysis component 108) to perform one or more acts. In various embodiments, the non-transitory computer-readable memory 104 can store computer-executable components (e.g., context component 106, analysis component 108), and the processor 102 can execute the computer-executable components.

In various embodiments, the system 100 can comprise a context component 106. In various instances, as described herein, the context component 106 can determine conditions or restrictions associated with a road. For example, the context component 106 can identify and interpret signs on a road that indicate restrictions on vehicle tires (e.g., studded tires prohibited, stud material restrictions, snow chains prohibited, winter tires prohibited, tire restrictions during a specified time period). As another example, the context component 106 can determine conditions of a road surface (e.g., wet road, icy road, presence of snow, road material, road surface quality).

In various embodiments, the system 100 can comprise an analysis component 108. In various cases, as described herein, the analysis component 108 can determine suitability for a vehicle to drive on the road based on attributes of tires of the vehicle. More specifically, the analysis component 108 can determine attributes of tires of the vehicle (e.g., tread depth, material, equipped studs, type, equipped snow chains) to determine if the vehicle is suitable to drive on a road based on a determination of conditions or restrictions (e.g., icy roads, tire stud bans) associated with a road. For example, if the context component 106 determines that roads are snowy and the analysis component determines that snow chains are not equipped to tires on a vehicle, the analysis component 108 can determine that the vehicle is not suitable to drive on the road. As another example, if the context component 106 determines, from a road sign, that rubber studded tires are prohibited on a road and the analysis component 108 determines that the vehicle is equipped with metal studded tires, the analysis component 108 can determine that the vehicle is suitable to drive on the road.

In various embodiments, the system 100 can comprise a sensor component 110. In various aspects, as described herein, the sensor component 110 can obtain, via any suitable sensors of the vehicle, vicinity data 112. In various cases, the vicinity data 112 can exhibit any suitable format, size, or dimensionality. For example, the vicinity data 112 can comprise one or more scalars, one or more vectors, one or more matrices, one or more tensors, one or more character strings, or any suitable combination thereof.

In various aspects, the sensor component 110 can be various external sensors, such as road-facing cameras or road-facing microphones. In various aspects, the vehicle can utilize such external sensors to capture vicinity data of a vicinity of the vehicle (e.g., to capture pictures of roadways, to capture noises that occur in the vicinity of the vehicle). For example, the sensor component 110 can capture conditions of the road that the vehicle is driving upon (e.g., surface texture). Thus, the context component 106 can access such sensor data and determine conditions or restrictions associated with a road. Accordingly, the analysis component 108 can determine if a vehicle is suitable to drive on the road conditions and attributes of tires of the vehicles.

In various instances, a vehicle can be equipped with internal sensors (e.g., laser sensors, pressure sensors, ultrasonic sensors, visual sensors) to monitor aspects of vehicle tires (e.g., tire pressure, tread depth, presence of studs, presence of tire chains, tire type, tire material). For example, pressure sensors can be utilized to actively measure the tire pressure of one or more tires of the vehicle (e.g., tire pressure monitoring system). As another example, a laser sensor can be utilized to actively measure and monitor a tire's tread depth by emitting a light beam onto a tire's surface and calculating the depth of the tire by analyzing the reflection and refraction of the light. Thus, the analysis component 108 can access the monitored data by various internal sensors to actively determine attributes or conditions of one or tires of a vehicle.

Figure 2:
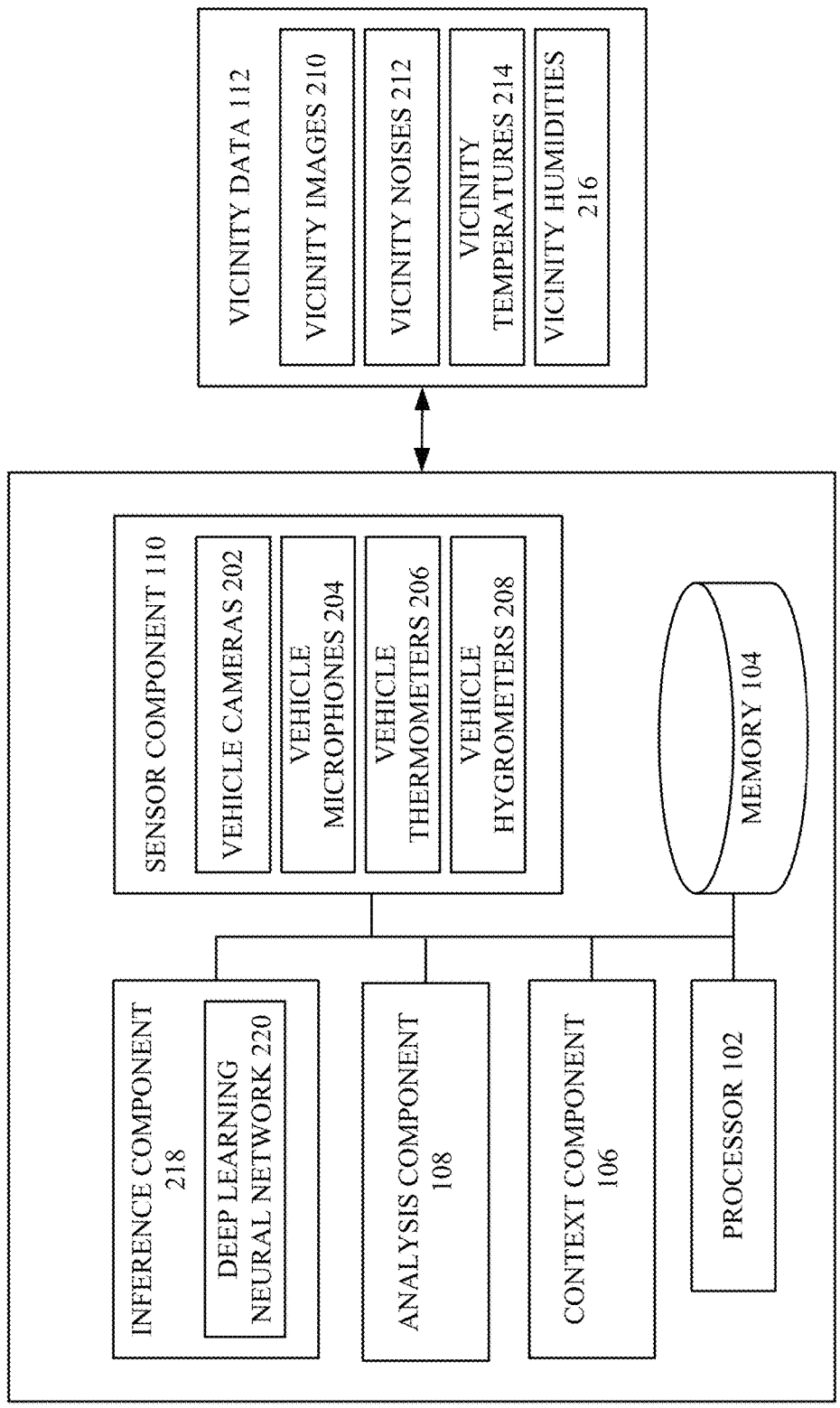
FIG. 2 illustrates a block diagram of an example, non-limiting system that facilitates determining suitability of tires for vehicle operation in accordance with one or more embodiments described herein.

FIG. 2 illustrates a block diagram of an example, non-limiting system 200 that can facilitate determining suitability of tires for vehicle operation in accordance with one or more embodiments described herein. As shown, the system 200 can, in some cases, comprise the same components as the system 100, and can further comprise an inference component 218 and a deep learning neural network 220.

In various embodiments, the sensor component 110 can electronically control, electronically execute, electronically activate, or otherwise electronically access any suitable sensors of the vehicle. In various aspects, such sensors can be external or road-facing. In other words, such sensors can be oriented or otherwise configured to monitor the surroundings of the vehicle as the vehicle drives around or is parked.

As a non-limiting example, such sensors can include a set of vehicle cameras 202. In various aspects, the set of vehicle cameras 202 can include any suitable number of any suitable types of cameras (e.g., of image-capture devices). In various instances, the set of vehicle cameras 202 can be integrated into or onto the vehicle. In various cases, one or more of the set of vehicle cameras 202 can be forward-facing. For example, such one or more cameras can be integrated into or onto any suitable forward-facing surfaces, whether interior or exterior, of the vehicle (e.g., can be built on a dash of the vehicle so as to look through a front windshield of the vehicle, can be built around the front windshield of the vehicle, can be built into a front bumper of the vehicle, can be built around headlights of the vehicle, can be built into a hood of the vehicle). Because such one or more cameras can be forward-facing, such one or more cameras can be configured to capture or otherwise record images or video frames of portions of the vicinity that lie in front of the vehicle. In various aspects, one or more of the set of vehicle cameras 202 can be rearward-facing. For example, such one or more cameras can be integrated into or onto any suitable rearward-facing surfaces, whether interior or exterior, of the vehicle (e.g., can be built into or on a rearview mirror of the vehicle, can be built into or onto sideview mirrors of the vehicle, can be built around a rear windshield of the vehicle, can be built into a rear bumper of the vehicle, can be built around taillights of the vehicle, can be built into a trunk-cover of the vehicle). Because such one or more cameras can be rearward-facing, such one or more cameras can be configured to capture or otherwise record images or video frames of portions of the vicinity that lie behind the vehicle. In various instances, one or more of the set of vehicle cameras 202 can be laterally-facing. For example, such one or more cameras can be integrated into or onto any suitable lateral surfaces, whether interior or exterior, of the vehicle (e.g., can be built into or around doors or door handles of the vehicle, can be built into or around fenders of the vehicle). Because such one or more cameras can be laterally-facing, such one or more cameras can be configured to capture or otherwise record images or video frames of portions of the vicinity that lie beside the vehicle.

As another non-limiting example, such sensors can include a set of vehicle microphones 204. In various aspects, the set of vehicle microphones 204 can include any suitable number of any suitable types of microphones (e.g., of sound-capture devices). In various instances, the set of vehicle microphones 204 can be integrated into or onto the vehicle. In various cases, one or more of the set of vehicle microphones 204 can be forward-facing. For example, such one or more microphones can be integrated into or onto any suitable forward-facing surfaces, whether interior or exterior, of the vehicle, so as to capture or otherwise record sounds or noises that occur in portions of the vicinity that lie in front of the vehicle. In various aspects, one or more of the set of vehicle microphones 204 can be rearward-facing. For example, such one or more microphones can be integrated into or onto any suitable rearward-facing surfaces, whether interior or exterior, of the vehicle, so as to capture or otherwise record sounds or noises that occur in portions of the vicinity that lie behind the vehicle. In various instances, one or more of the set of vehicle microphones 204 can be laterally-facing. For example, such one or more microphones can be integrated into or onto any suitable lateral surfaces, whether interior or exterior, of the vehicle, so as to capture or otherwise record sounds or noises that occur in portions of the vicinity that lie beside the vehicle.

As yet another non-limiting example, such sensors can include a set of vehicle thermometers 206. In various aspects, the set of vehicle thermometers 206 can include any suitable number of any suitable types of thermometers (e.g., of temperature sensors). In various instances, the set of vehicle thermometers 206 can be integrated into or onto the vehicle. In various cases, one or more of the set of vehicle thermometers 206 can be forward-facing. For example, such one or more thermometers can be integrated into or onto any suitable forward-facing surfaces, whether interior or exterior, of the vehicle, so as to capture or otherwise record air temperatures or road surface temperatures associated with portions of the vicinity that lie in front of the vehicle. In various aspects, one or more of the set of vehicle thermometers 206 can be rearward-facing. For example, such one or more thermometers can be integrated into or onto any suitable rearward-facing surfaces, whether interior or exterior, of the vehicle, so as to capture or otherwise record air temperatures or road surface temperatures associated with portions of the vicinity that lie behind the vehicle. In various instances, one or more of the set of vehicle thermometers 206 can be laterally-facing. For example, such one or more thermometers can be integrated into or onto any suitable lateral surfaces, whether interior or exterior, of the vehicle, so as to capture or otherwise record air temperatures or road surface temperatures associated with portions of the vicinity that lie beside the vehicle.

As even another non-limiting example, such sensors can include a set of vehicle hygrometers 208. In various aspects, the set of vehicle hygrometers 208 can include any suitable number of any suitable types of hygrometers (e.g., of moisture or humidity sensors). In various instances, the set of vehicle hygrometers 208 can be integrated into or onto the vehicle. In various cases, one or more of the set of vehicle hygrometers 208 can be forward-facing. For example, such one or more hygrometers can be integrated into or onto any suitable forward-facing surfaces, whether interior or exterior, of the vehicle, so as to capture or otherwise record air humidities or road surface moisture levels associated with portions of the vicinity that lie in front of the vehicle. In various aspects, one or more of the set of vehicle hygrometers 208 can be rearward-facing. For example, such one or more hygrometers can be integrated into or onto any suitable rearward-facing surfaces, whether interior or exterior, of the vehicle, so as to capture or otherwise record air humidities or road surface moisture levels associated with portions of the vicinity that lie behind the vehicle. In various instances, one or more of the set of vehicle hygrometers 208 can be laterally-facing. For example, such one or more hygrometers can be integrated into or onto any suitable lateral surfaces, whether interior or exterior, of the vehicle, so as to capture or otherwise record air humidities or road surface moisture levels associated with portions of the vicinity that lie beside the vehicle.

In any case, the sensor component 110 can utilize such sensors to capture, record, or otherwise measure the vicinity data 112.

For example, the set of vehicle cameras 202 can capture a set of vicinity images 210 while the vehicle is driving or parked. In various aspects, the set of vicinity images 210 can include any suitable number of images or video frames (e.g., any suitable number of two-dimensional pixel arrays) that can depict portions of the vicinity (e.g., portions of the vicinity that lie in front of, behind, or beside the vehicle).

As another example, the set of vehicle microphones 204 can capture a set of vicinity noises 212 while the vehicle is driving or parked. In various instances, the set of vicinity noises 212 can include any suitable number of audio clips that can represent noises occurring in portions of the vicinity (e.g., in portions of the vicinity that lie in front of, behind, or beside the vehicle).

As yet another example, the set of vehicle thermometers 206 can capture a set of vicinity temperatures 214 while the vehicle is driving or parked. In various aspects, the set of vicinity temperatures 214 can include any suitable number of temperature measurements that can represent air temperatures or road surface temperatures associated with portions of the vicinity (e.g., with portions of the vicinity that lie in front of, behind, or beside the vehicle).

As still another example, the set of vehicle hygrometers 208 can capture a set of vicinity humidities 216 while the vehicle is driving or parked. In various aspects, the set of vicinity humidities 216 can include any suitable number of humidity measurements or moisture measurements that can represent air humidity levels or road surface moisture levels associated with portions of the vicinity (e.g., with portions of the vicinity that lie in front of, behind, or beside the vehicle).

In any case, the set of vicinity images 210, the set of vicinity noises 212, the set of vicinity temperatures 214, and the set of vicinity humidities 216 can collectively be considered as the vicinity data 112.

In various embodiments, the system 300 can comprise an inference component 218. In various instances, as described herein, the inference component 218 can detect environment and road conditions within the vicinity, based on the vicinity data 112.

In various embodiments, the inference component 218 can electronically store, electronically maintain, electronically control, or otherwise electronically access the deep learning neural network 220. In various aspects, the deep learning neural network 220 can have or otherwise exhibit any suitable internal architecture. For instance, the deep learning neural network 220 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

No matter the internal architecture of the deep learning neural network 220, the deep learning neural network 220 can be configured to detect road surface conditions based on the vicinity data 112.

As shown, the inference component 218 can, in various aspects, execute the deep learning neural network 220 on the vicinity data 112, and such execution can cause the deep learning neural network 220 to produce detections of obstacles or hazardous roadway conditions. More specifically, the inference component 218 can feed the vicinity data 112 (e.g., the set of vicinity images 210, the set of vicinity noises 212, the set of vicinity temperatures 214, or the set of vicinity humidities 216) to an input layer of the deep learning neural network 220. In various instances, the vicinity data 112 (e.g., the set of vicinity images 210, the set of vicinity noises 212, the set of vicinity temperatures 214, or the set of vicinity humidities 216) can complete a forward pass through one or more hidden layers of the deep learning neural network 220. In various cases, an output layer of the deep learning neural network 220 can detect obstacles or hazardous conditions, based on activation maps or intermediate features produced by the one or more hidden layers.

In various embodiments, the inference component 218 can execute the deep learning neural network 220 on the vicinity data 112 to detect surface road conditions (e.g., ice on a road, wet roads from rainfall, presence of snow) or road signs. For instance, the sensor component 110 can capture the vicinity data 112 when the vehicle is in motion, and the deep learning neural network 220 can be trained or otherwise configured to determine, based on the vicinity data 112, surface conditions of a road or restrictions identified on road signs. In other words, if such conditions are occurring, some manifestation of such conditions can be conveyed in the vicinity data 112 (e.g., rainfall can be depicted in the set of vicinity images 210, distinctive sounds of the rainfall can be captured in the set of vicinity noises 212, rainfall can be detected in the set of vicinity humidities 216, text on a road sign depicted in the set of vicinity images 210), and the deep learning neural network 220 can recognize such manifestation of the conditions (e.g., the presence and severity of the rainfall, the presence of a road sign that prohibits metal studs). Therefore, for example, if the analysis component 108 determines that tire vehicles have low tread depth and heavy rainfall is detected, a determination can be made that the vehicle is not suitable to drive on the road due to a potential for hazardous situations to occur (e.g., hydroplaning, sliding). Furthermore, the inference component 218 can utilize a language processing model to interpret text on detected road signs to determine the specified restriction. Thus, the context component 106 can actively classify interpreted restrictions based on type (e.g., restriction on studs, restriction on snow chains, restriction on tire type), time (e.g., when the restrictions apply), or location (e.g., street, city). In various aspects, the context component 106 can employ other suitable attributes to classify and determine restrictions detected on road signs. For example, if the inference component 218 detects a road sign that states metal studs are prohibited during specified months in a particular city, interpreted by the language processing model, the context component 106 can classify the restriction with the type, time, or location. Accordingly, the analysis component 108 can, in response to such detections by the inference component 218, determine suitability of the vehicle to drive on a road based on current tire attributes, location of the vehicle, and time. From the above example, if the vehicle is equipped with metal studs but is driving during a month that was not restricted, the analysis component 108 can make a determination that the vehicle is suitable to drive on the road.

Figure 3:
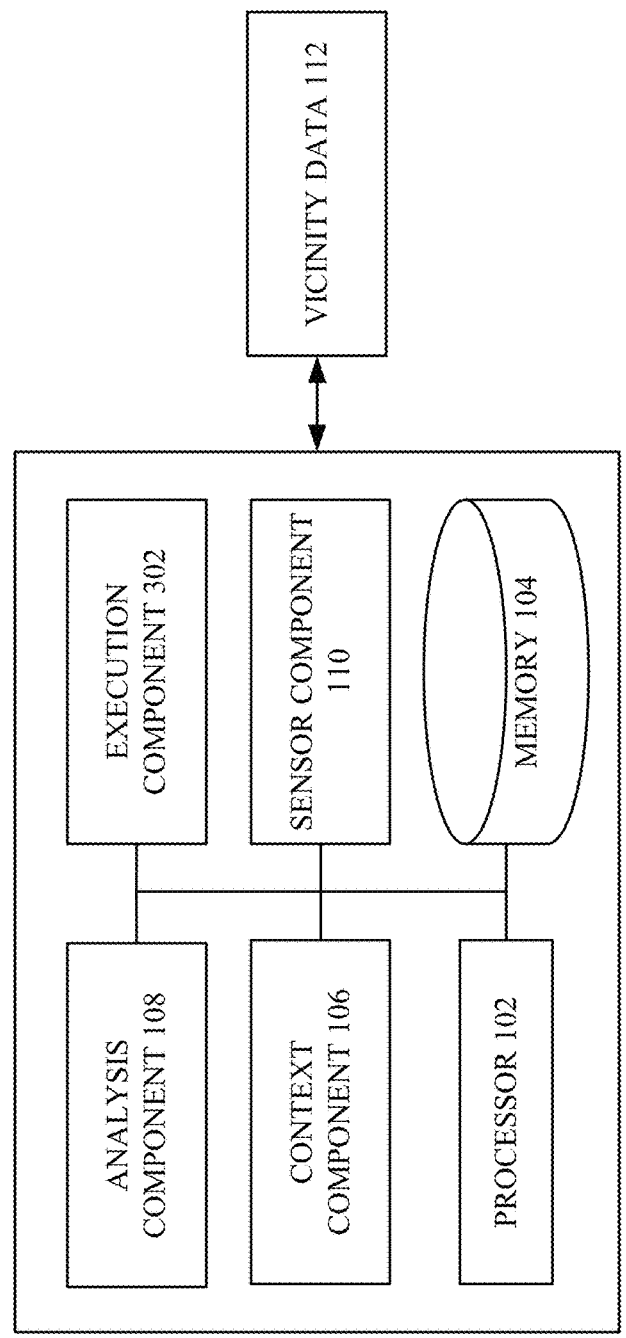
FIG. 3 illustrates a block diagram of an example, non-limiting system that facilitates determining suitability of tires for vehicle operation in accordance with one or more embodiments described herein.

FIG. 3 illustrates a block diagram of an example, non-limiting system 300 including an execution component that can facilitate determining suitability of tires for vehicle operation in accordance with one or more embodiments described herein. As shown, the system 300 can, in some cases, comprise the same components as the system 200, and can further comprise an execution component 302.

In various embodiments, the execution component 302 can conduct, initiate, facilitate, or otherwise perform any suitable electronic actions, in response to the analysis component 108 (e.g., in response to a determination that the vehicle is not suitable to drive on a road). In contrast, the control component 108 can, in various instances, refrain from conducting, initiating, facilitating, or otherwise performing such electronic actions, in response to the determination component 106 (e.g., in response to a determination that the vehicle is suitable to drive on a road).

In various embodiments, the execution component 302 can, in response to a determination that the vehicle is not suitable to drive on a road (e.g., a vehicle is equipped with studded tires and driving in a city that prohibits studded tires, a vehicle is equipped with summer tires and is driving on a snowy road), display an electronic notification to the driver on any type of vehicle display (e.g., dashboard display, head-up display). The electronic notification can comprise any corresponding warning or recommendation message. For example, if the context component 106 determines that the vehicle is driving on an icy road, and further determines that the vehicle is not equipped with studs and has low tread depth, the analysis component 108 can determine that the vehicle is not suitable to drive on the road. Thus, in response to the determination that the vehicle is not suitable to drive on an icy road with low tread depth and no studs, the analysis component 108 can engage the execution component 302 to transmit a warning message to the driver on a vehicle display. The warning message can, for example, instruct or recommend the driver to replace one or more tires on the vehicle. The warning message can further instruct or recommend the driver to equip studs or snow chains on the vehicle tires. In various aspects, the execution component 302 can further transmit reminders to the driver on a vehicle display to unequip or equip various tire devices. For example, if a driver inputs a navigation route for a future date on a navigation system, the execution component 302 can schedule a reminder to be displayed based upon current attributes of the vehicle tires.

In various aspects, the analysis component 108 can compute a potential cost in fees (e.g., tickets) that a driver may accumulate if driving on road that the vehicle is not suitable to drive on based upon violation of traffic laws. In other words, if the execution component 302 displays an electronic notification on a vehicle display noting that the vehicle is not suitable to drive on the road due to violation of traffic laws, and the driver continues to drive on the road (e.g., disregards the electronic notification), the analysis component 108 can compute a cost the driver may accumulate in tickets or fees if discovered by an authority (e.g., city police, traffic authorities). Thus, the execution component 302 can display the computed potential cost on a vehicle display to notify the driver.

In various embodiments, the execution component 302 can transmit an electronic notification to an appropriate authority (e.g., traffic authorities, police authorities) based upon a determination that the vehicle is violating traffic laws regarding permissibility of tire attributes (e.g., driving a vehicle equipped with studded tires on a road that prohibits studded tires). The execution component 302 can transmit a notification that includes the location of the vehicle and the traffic law in violation by the vehicle. In various instances, the execution component 302 can transmit the notification to authorities within a defined region of the location of the vehicle (e.g., transmit notification to police authority of the city in which the vehicle is located in).

Figure 4:
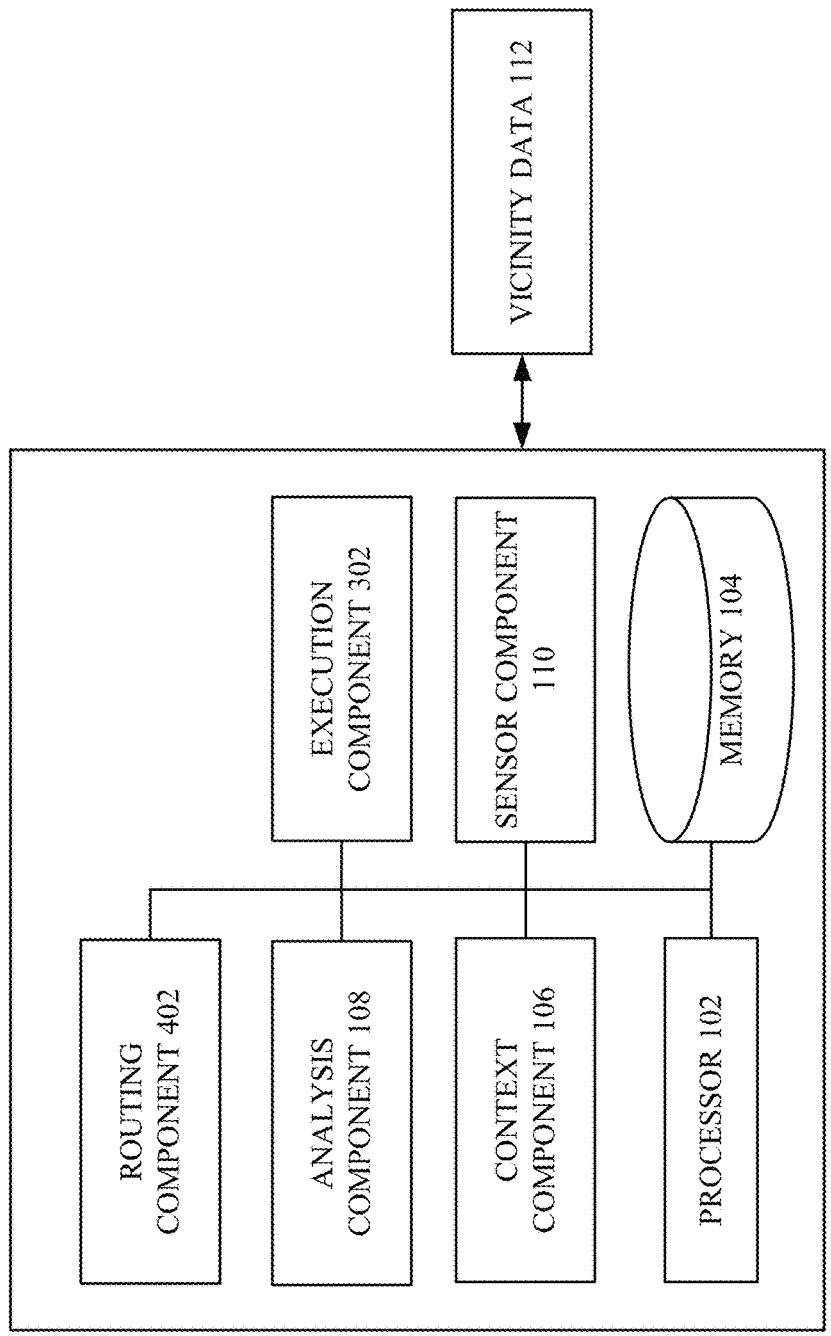
FIG. 4 illustrates a block diagram of an example, non-limiting system that facilitates determining suitability of tires for vehicle operation for determining navigation routes in accordance with one or more embodiments described herein.

FIG. 4 illustrates a block diagram of an example, non-limiting system 400 that can facilitate determining suitability of tires for vehicle operation to determine navigation routes in accordance with one or more embodiments described herein. As shown, the system 400 can in some cases, comprise the same components as the system 300, and can further comprise a routing component 402.

In various embodiments, the routing component 402 can, in connection with external navigation applications or a navigation system onboard the vehicle, compute a permissible navigation route that the vehicle is suitable to drive on based on attributes of the tires. More specifically, the routing component 402 can determine a navigation route that the vehicle can take to an input destination such that the vehicle will be compliant with traffic laws and restrictions determined by the context component 106. For example, if the routing component 402 receives an input destination, the routing component 402 can engage the analysis component 108 to determine attributes of tires on the vehicle. Thus, the routing component 402 can engage the analysis component 108 to determine which roads the vehicle is allowed to travel on, based on transportation datasets that specify types of restrictions for particular locations (e.g., street, city, country). In various aspects, the routing component 402 can compute one or more permissible navigation routes from the determined permitted roads.

Figure 5A:
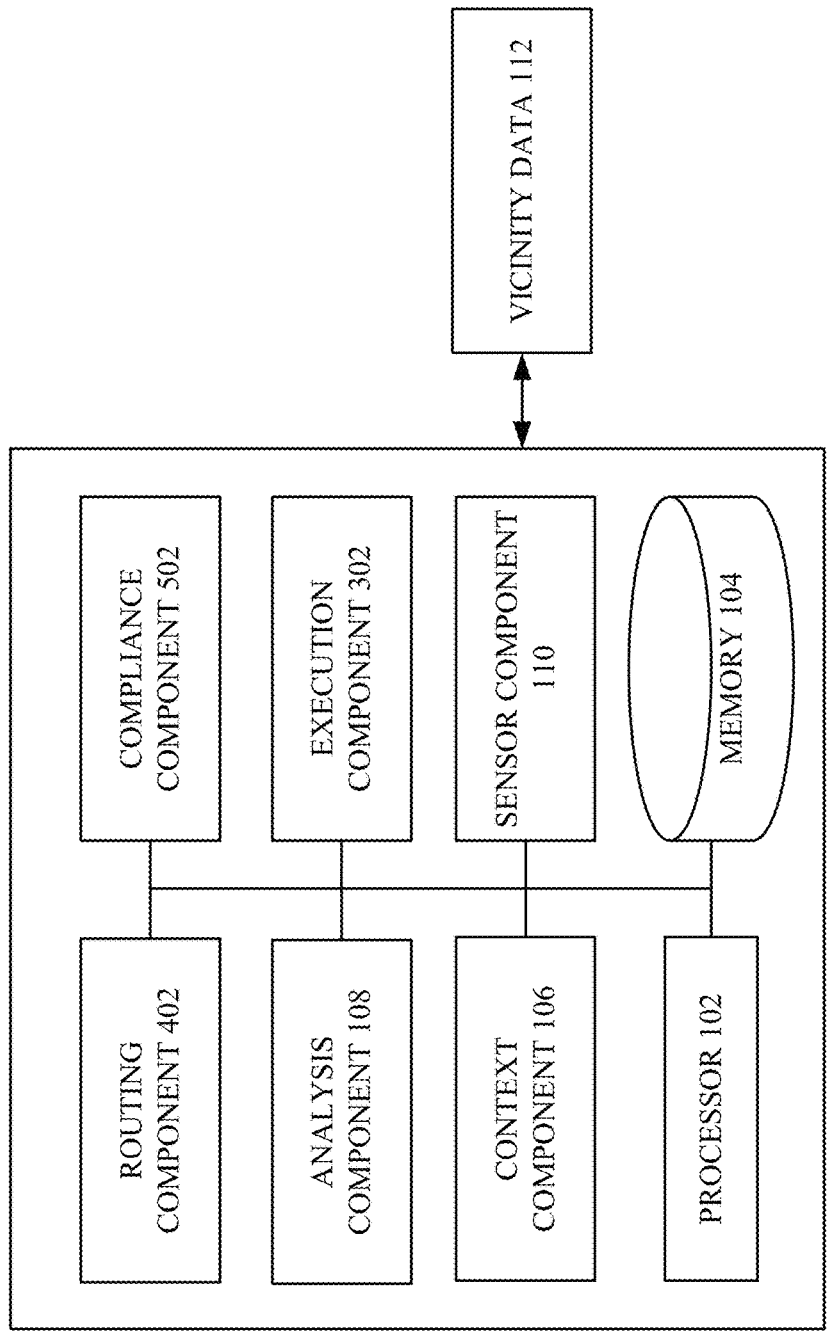
FIG. 5A illustrates a block diagram of an example, non-limiting system that facilitates determining suitability of tires for vehicle operation in accordance with one or more embodiments described herein.

FIG. 5A illustrates a block diagram of an example, non-limiting system 500A including a deep learning neural network that can facilitate determining suitability of tires for vehicle operation in accordance with one or more embodiments described herein. As shown, the system 500 can, in some cases, comprise the same components as the system 400, and can further comprise a compliance component 502.

In various embodiments, the analysis component 108 can engage the compliance component 502 to determine a registration (e.g., permit) status of various vehicle tire devices (e.g., studs, snow chains), from which the analysis component 108 can determine if the vehicle is suitable to drive on a road. Based on various attributes of a permit (e.g., active, payment status, fees, location), the compliance component 502 can determine a binary judgment on if the vehicle is permissible to drive on a road. More specifically, the binary judgement can be defined as either allowed or not allowed to drive on the road. For example, the compliance component 502 can receive input from a driver of any registration statuses for the vehicle (e.g., registration for studs in a particular city) for any particular geographic location. Furthermore, the compliance component 502 can receive input dates of expiration of the registration. In various embodiments, the compliance component 502 can also receive input of payment status (e.g., unpaid fees, permit paid and active) to determine if a permit is active or approved. Thus, the analysis component 108 can receive the binary judgement (e.g., allow, not allowed) as output from the compliance component 502 to make a determination if the vehicle is suitable to drive on a road based on registration status. In various embodiments, the compliance component 502 can also compute a total fee amount that the driver can accumulate on a determined navigation route. For example, if a permit specifies a fee amount per a specified unit of distance (e.g., fee amount per mile) to drive with prohibited tire devices, the compliance component 502 can calculate the total fee amount for a navigation route.

Figure 5B:
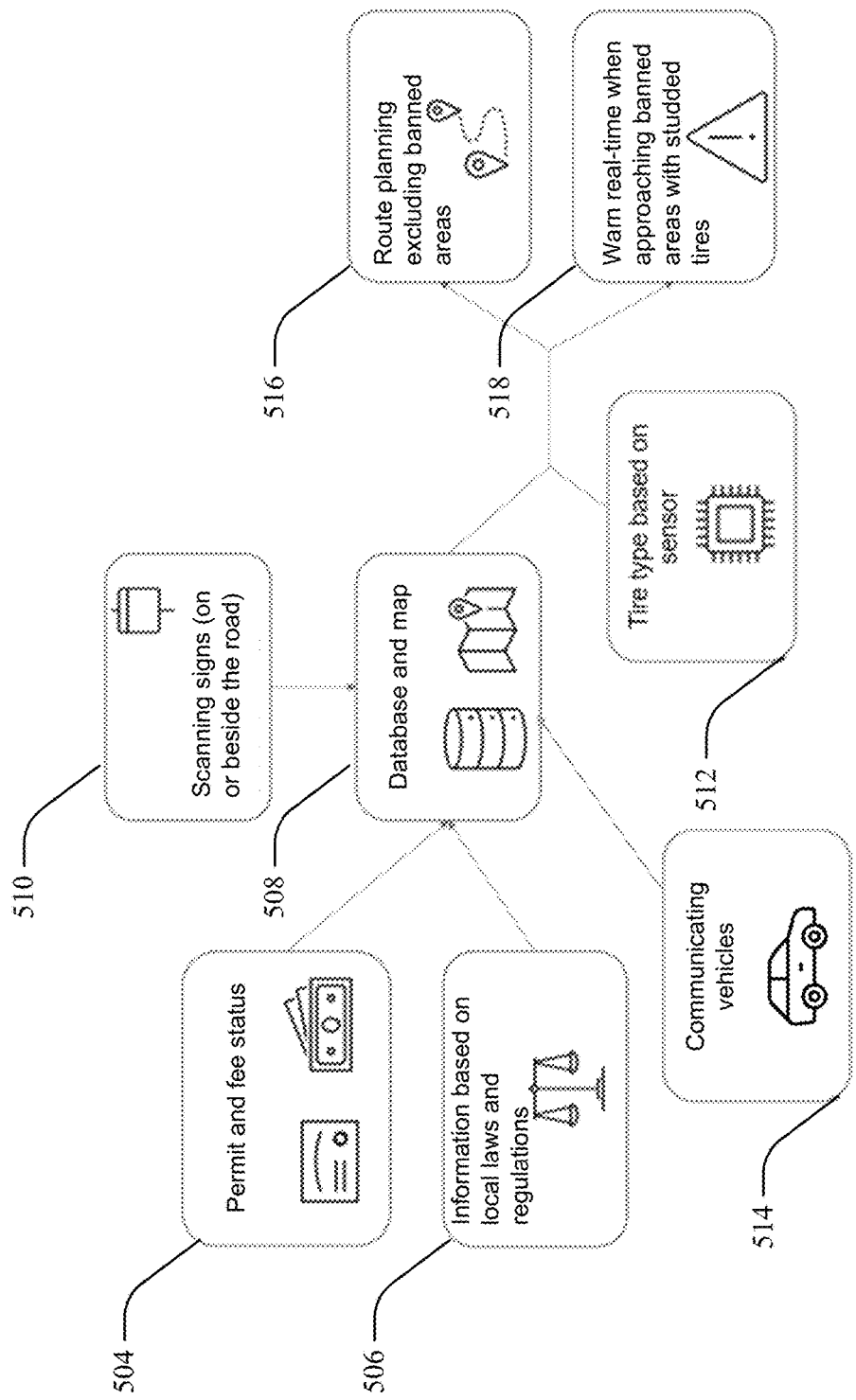
FIG. 5B illustrates a block diagram of an example, non-limiting system that can facilitate determining suitability of tires for vehicle operation in accordance with one or more embodiments described herein.

FIG. 5B illustrates a block diagram of an example, non-limiting system 500B that can facilitate determining suitability of tires for vehicle operation in accordance with one or more embodiments described herein.

In various embodiments, the analysis component 108 can generate or utilize a database and map 508 that can store detected restrictions from road signs 608 or restrictions identified from transportation databases that contain local laws and regulations (e.g., countries where studded tires are banned, streets that prohibit snow chains), depicted in 506. More specifically, when a road is detected that specifies a restriction related to tire attributes, the analysis component 108 can actively update the stored database and map 508. Therefore, the analysis component 108 can utilize already identified restrictions from the database and map 508 to determine if a vehicle is suitable to drive on a road based on tire attributes. Furthermore, the routing component 402 can utilize the stored database and map 508 to determine permissible navigation routes to a target destination. Moreover, the analysis component 108 can utilize the stored database and map 508 in parallel with compliance component 502 to determine permitted roads to drive on based on permit and fee payment status 504. Therefore, the analysis component 108 can determine attributes of one or more tires of the vehicle, depicted by 512, after accessing the stored database and map 508 to determine if the vehicle is suitable to drive on a road or a computed navigation route 510 by the routing component 402. Furthermore, in response to a determination if the vehicle is suitable to drive on the road based on tire attributes, the execution component 302 can transmit an electronic notification 516 in real-time on a vehicle display. For example, if a road sign is detected that states studded tires are banned on the street or an upcoming street, and the vehicle is equipped with studded tires, the execution component can display a warning message and enable the driver to take an alternative street. In various instances, the shared database and map 508 can be shared among other vehicles that employ the vehicle tire area control system. For example, if one vehicle detects a road sign and stores the identified restriction in the stored database and map, a second vehicle can access such identified restriction for, as an example, determining navigation routes 514 by the routing component 402. Furthermore, a vehicle can transmit, via execution component 302, an electronic notification to other communicating vehicles 514 within a vicinity of determined restrictions or conditions associated with a road. For example, a vehicle can detect a restriction (e.g., road sign) or conditions through the inference component 218 or access information regarding the restriction or conditions through the shared database and map 508. Thus, through direct or indirect communication (e.g., via a central infrastructure) the vehicle can make the identified restrictions or conditions available to other vehicles within the vicinity (e.g., to vehicles approaching the road with the determined restrictions).

In various embodiments, the context component 106 can engage the compliance component 502 to determine a registration status of various vehicle tire devices (e.g., studs, snow chains), from which the analysis component 108 can determine if the vehicle is suitable to drive on a road. Permissibility of vehicles equipped with studs or snow chains in a restricted area can depend upon a registration status in some locations. For example, the compliance component 502 can receive input from a driver of any registration statuses for the vehicle (e.g., registration for studs in a particular city) for any particular geographic location. More specifically, a driver can enter details of a permit (e.g., expiration dates, applicable regions, type of permit) on a vehicle display (e.g., touch display). For example, the compliance component 502 can receive input dates of expiration of the registration. Thus, the analysis component 108 can engage the compliance component 502 to make a determination if the vehicle is suitable to drive on a road.

Figure 6:
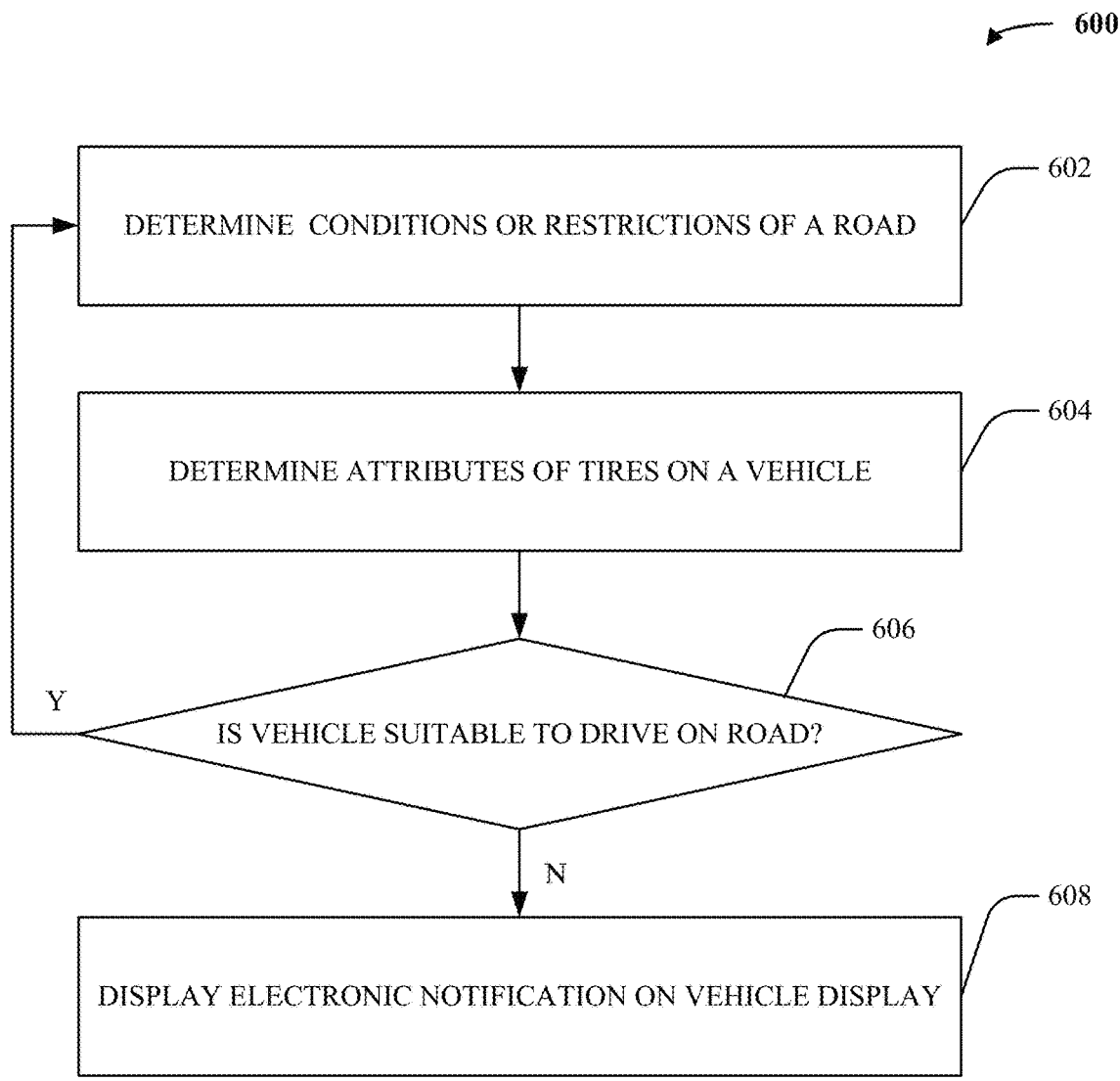
FIG. 6 illustrates a flow diagram of an example, non-limiting computer-implemented method that facilitates determining tire suitability for vehicle operation in accordance with one or more embodiments described herein.

FIG. 6 illustrates a flow diagram of an example, non-limiting computer-implemented method 600 that can facilitate determining suitability of tires for vehicle operation in accordance with one or more embodiments described herein. In various cases, the system 100 can facilitate the computer-implemented method 600.

In various embodiments, act 602 can include determining, by the context component (e.g., 106), conditions or restrictions of a road.

In various aspects, act 604 can include determining, by the context component (e.g., 106), attributes of tires on a vehicle.

In various cases, act 606 can include determining, by the analysis component (e.g., 108), whether the vehicle is suitable to drive on the road. If not (e.g., if the vehicle is not suitable to drive on the road), the computer-implemented method 600 can proceed to act 608. If so (e.g., if the vehicle is suitable to drive on the road), the computer-implemented method 600 can proceed to act 602.

In various aspects, act 608 can include displaying, by the execution component (e.g., 302), an electronic notification on a vehicle display.

For example, the context component 106 can determine that a road is dry by the inference component 218 executing the deep learning neural network 220 on vicinity data 112. The context component 106 can also determine that the vehicle is equipped with snow chains by the sensor component 110. Thus, the analysis component 108 can determine that the vehicle is not suitable to drive on the road because the vehicle is equipped with snow chains and road surface conditions are not snowy or icy. In response to a determination that the vehicle is not suitable to drive on the road, the analysis component 108 can engage the execution component 302 to transmit a warning or notification message on a vehicle display that notifies the driver that the vehicle is operating on dry roads with snow chains. Furthermore, the execution component 302 can notify the driver a recommendation or reminder to remove the snow chains from the vehicle tires.

Figure 7:
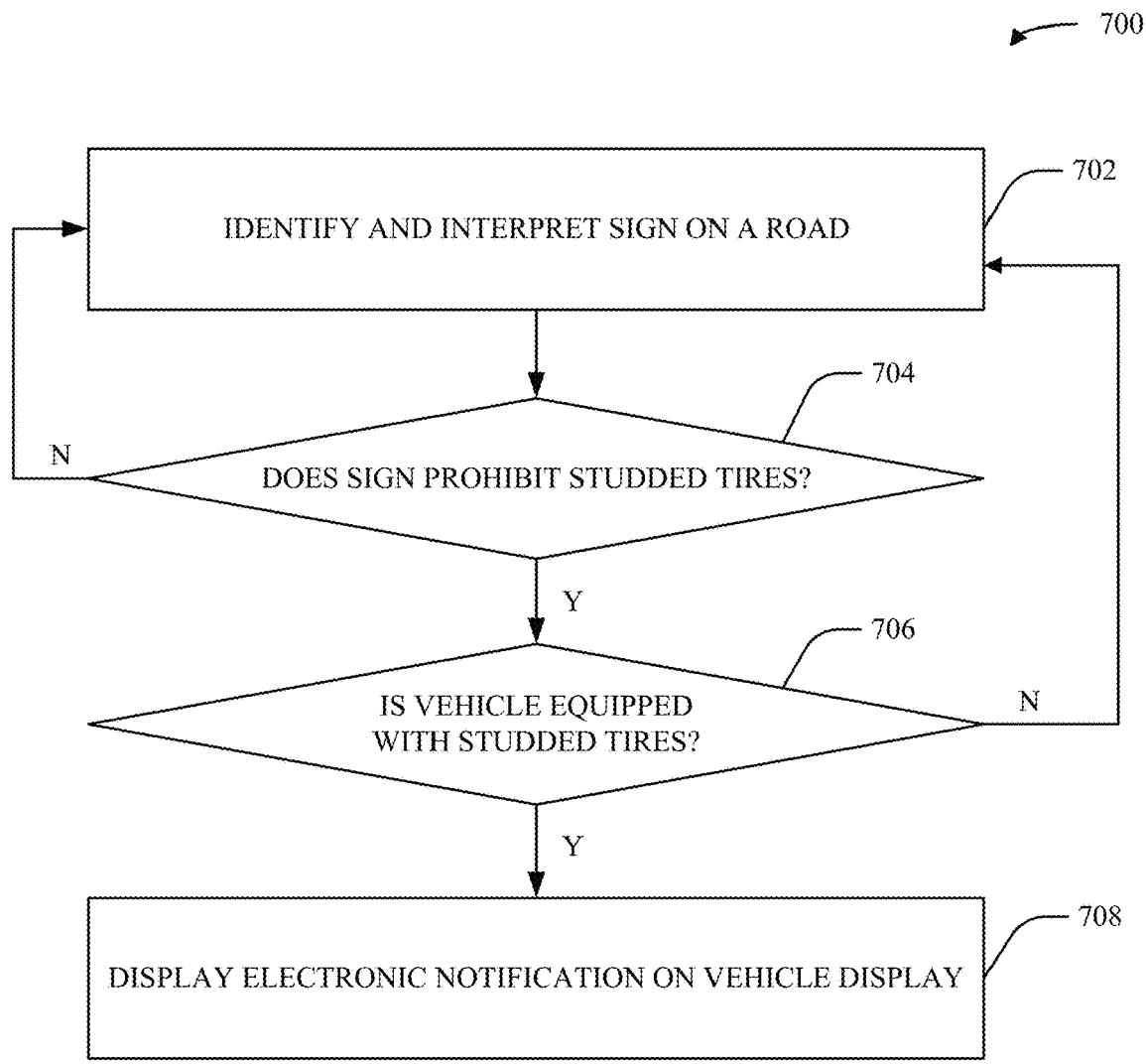
FIG. 7 illustrates a flow diagram of an example, non-limiting computer-implemented method that facilitates determining tire suitability for vehicle operation in accordance with one or more embodiments described herein.

FIG. 7 illustrates a flow diagram of an example, non-limiting computer-implemented method 700 that can facilitate an artificially intelligent vehicle rolling resistance system in accordance with one or more embodiments described herein. In various cases, the system 100 can facilitate the computer-implemented method 700.

In various embodiments, act 702 can include identifying and interpreting, by the context component (e.g., 106), signs on a road.

In various cases, act 702 can include determining, by the context component (e.g., 106), whether the signs prohibit studded tires. If not (e.g., if the sign does not prohibit tires), the computer-implemented method 700 can proceed to act 702. If so (e.g., if the sign prohibits studded tires), the computer-implemented method 700 can proceed to act 706.

In various cases, act 702 can include determining, by the context component (e.g., 106), if the vehicle is equipped with studded tires. If not (e.g., if the vehicle is not equipped with studded tires), the computer-implemented method 700 can proceed to act 702. If so (e.g., if the vehicle is equipped with studded tires), the computer-implemented method 700 can proceed to act 708.

In various embodiments, act 708 can include displaying, by the execution component (e.g., 302), an electronic notification on a vehicle display.

Figure 8:
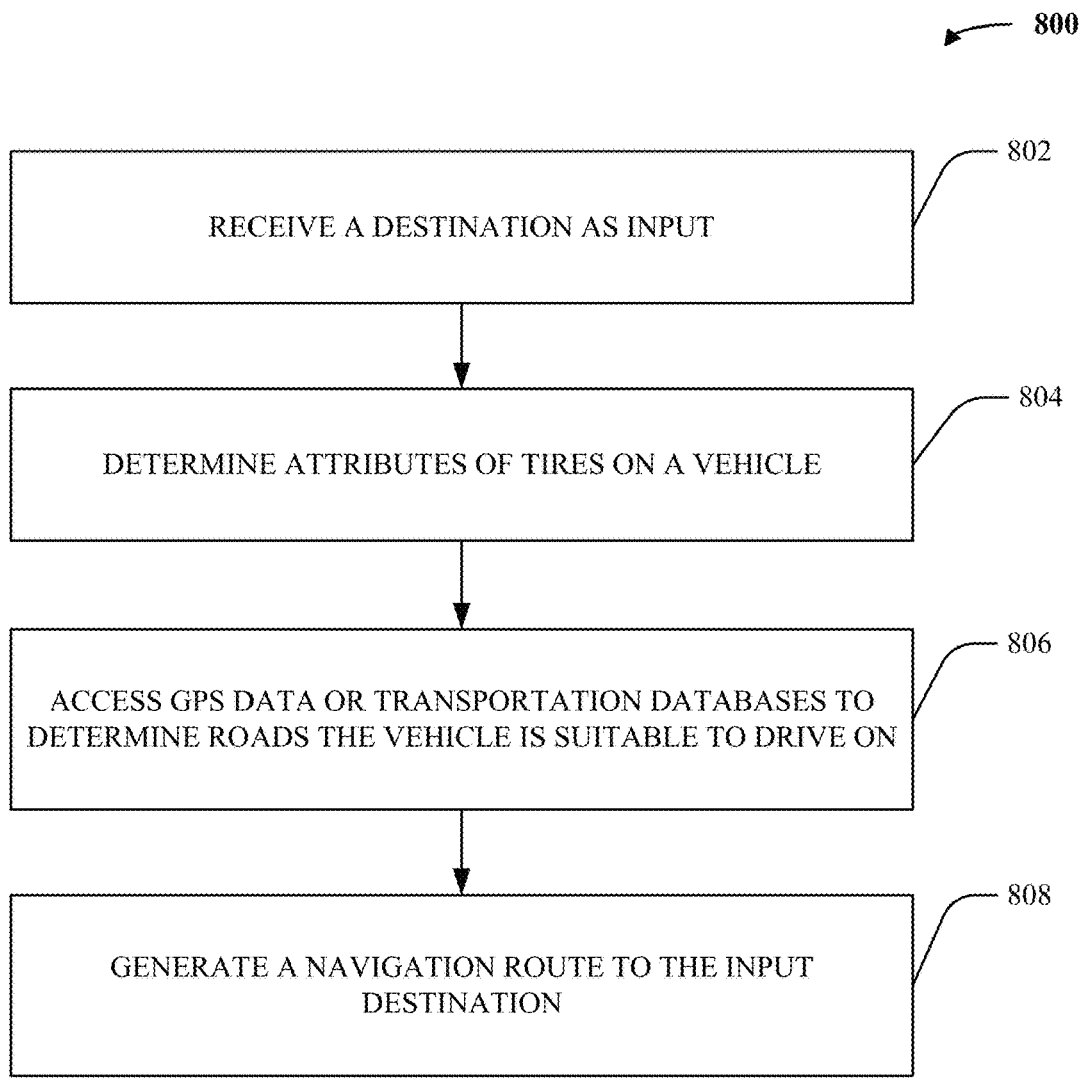
FIG. 8 illustrates a flow diagram of an example, non-limiting computer-implemented method that facilitates determining tire suitability for vehicle operation in accordance with one or more embodiments described herein.

FIG. 8 illustrates a flow diagram of an example, non-limiting computer-implemented method 800 that can facilitate an artificially intelligent vehicle rolling resistance system in accordance with one or more embodiments described herein. In various cases, the system 100 can facilitate the computer-implemented method 800.

In various embodiments, act 802 can include receiving, by the routing component (e.g., 402), a destination as input.

In various aspects, act 804 can include determining, by the context component (e.g., 106), attributes of tires on a vehicle.

In various aspects, act 806 can include accessing, by the analysis component (e.g., 108), GPS data or transportation databases to determine roads the vehicle is suitable to drive on.

In various aspects, act 808 can include generating, by the routing component (e.g., 402), a navigation route to the input destination.

For example, a driver can input a destination address (e.g., street, city, state) on a vehicle display. After, the context component 106 can determine current attributes of tires on the vehicle (e.g., equipped with metal studs, equipped with snow tires). Based on the determined tire attributes, the routing component 402 can engage the analysis component 108 to access GPS data to determine routes the driver can take. Furthermore, the analysis component 108 can access transportation databases to determine which streets have restrictions on the determined tire attributes (e.g., streets that ban metal studs or snow tires). Thus, the routing component 402 can engage the execution component 302 to present feasible routes (e.g., routes such that the determined tire attributes will not violate traffic laws) the driver can take to the input destination.

Although the herein disclosure mainly describes various embodiments as implementing deep learning neural networks (e.g., 502), this is a mere non-limiting example. In various aspects, the herein-described teachings can be implemented via any suitable machine learning models exhibiting any suitable artificial intelligence architectures (e.g., support vector machines, naïve Bayes, linear regression, logistic regression, decision trees, random forest).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, \ldots, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 9:
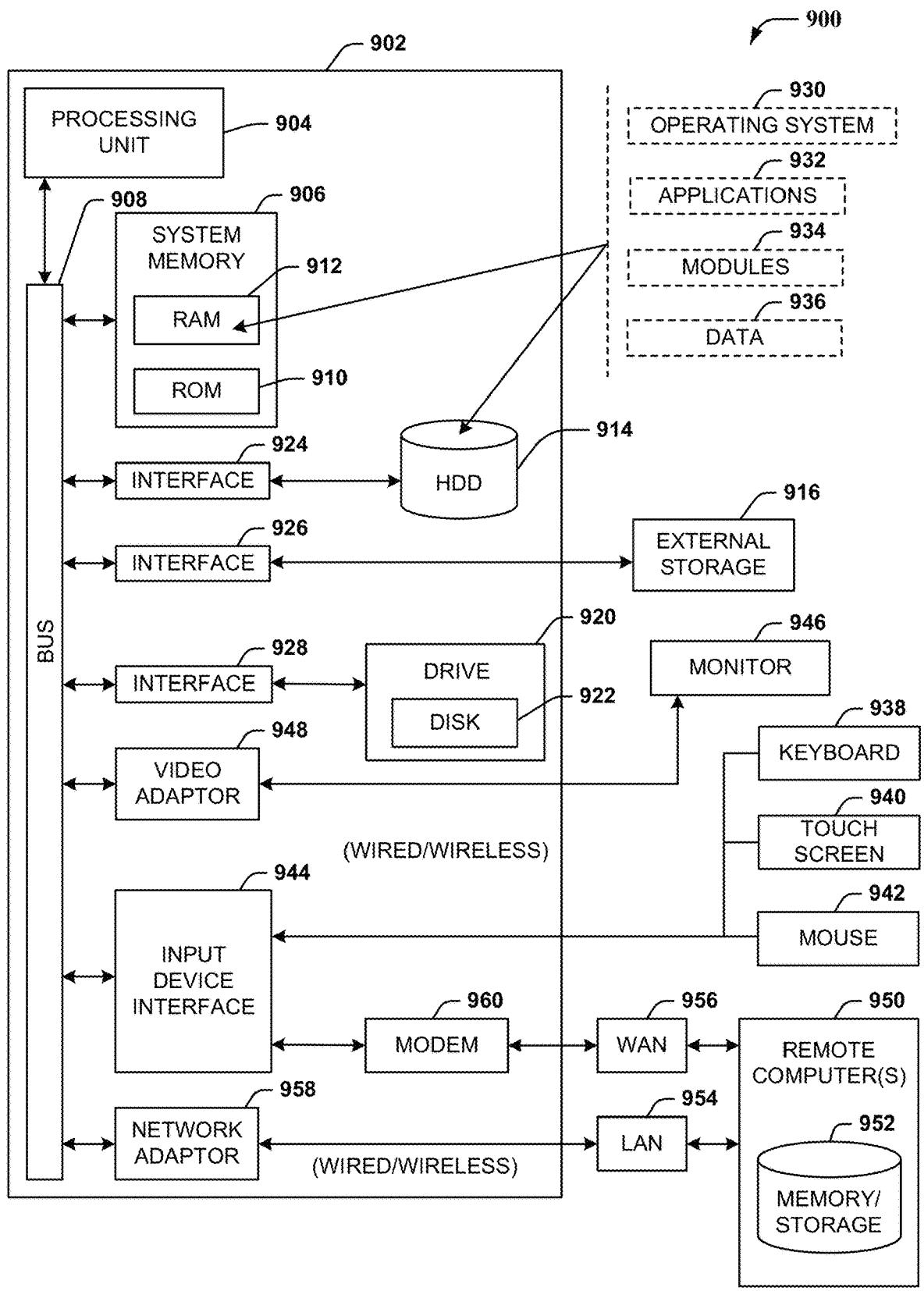
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HIDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) or multiple VMs hosted at computer 902. Furthermore, operating system 930 can provide runtime environments, such as the Java runtime environment or the NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
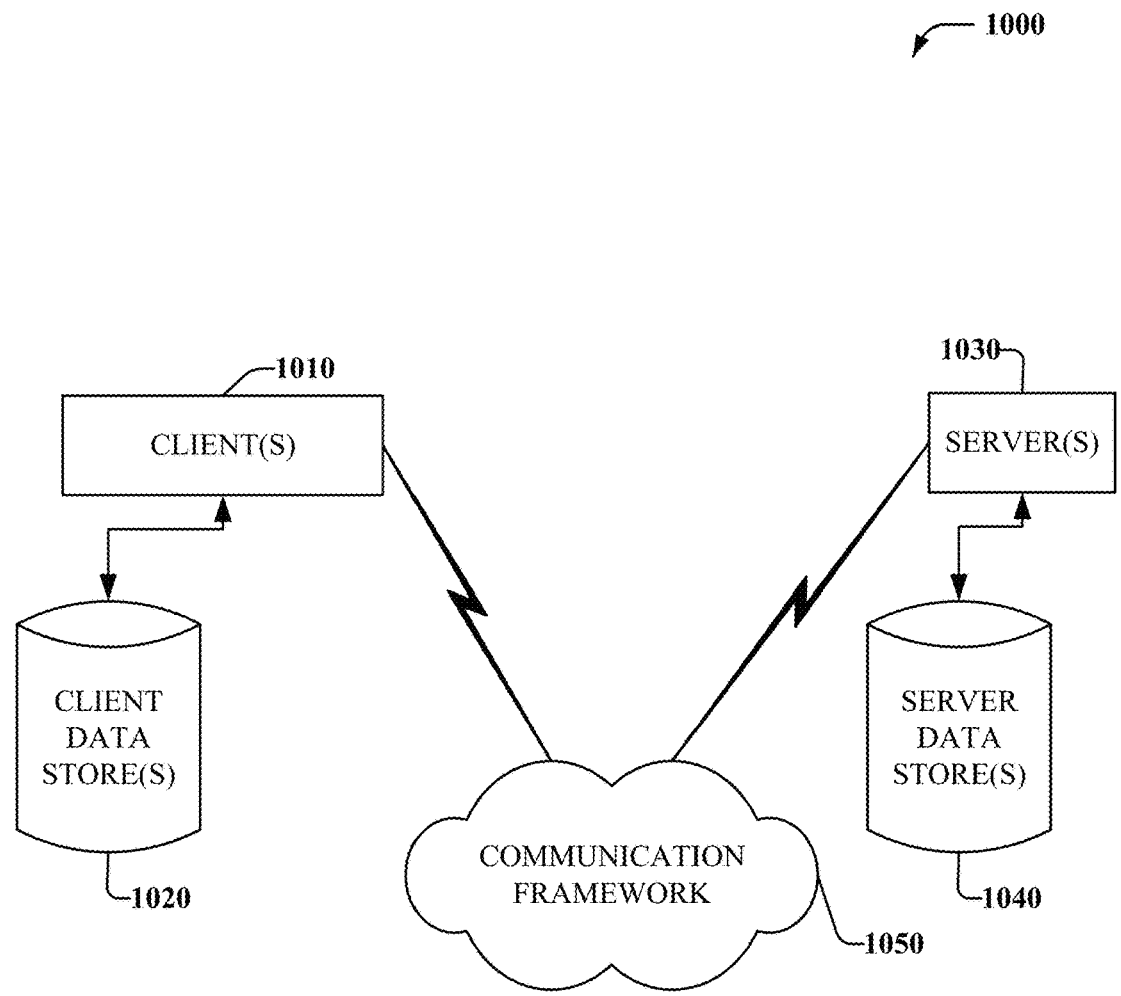
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware or software (e.g., threads, processes, computing devices). The sample computing environment 1000 also includes one or more server(s) 1030. The server(s) 1030 can also be hardware or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects of various embodiments described herein are presented in the following clauses.

Clause 1: A system, comprising: a processor that executes computer-executable components stored in a non-transitory computer-readable memory, the computer-executable components comprising: a context component that determines conditions or restrictions associated with a road; and an analysis component that determines suitability for a vehicle to drive on the road based on attributes of tires of the vehicle.

Clause 2: The system of any preceding clause, wherein the context component actively identifies and interprets signs on the road.

Clause 3: The system of any preceding clause, wherein the analysis component determines, via sensors, if the vehicle is equipped with studded tires or snow chain.

Clause 4: The system of any preceding clause, wherein the analysis component determines tread depth of one or more tires of the vehicle.

Clause 5: The system of any preceding clause, wherein the analysis component determines what type of stud or snow chain the vehicle is equipped with.

Clause 6: The system of any preceding clause, wherein an execution component displays an electronic notification on a vehicle display in response to a determination that the vehicle is not suitable to drive on the road.

Clause 7: The system of any preceding clause, wherein the context component determines surface conditions of the road based on vicinity data.

Clause 8: The system of any preceding clause, wherein the analysis component employs GPS data and transportation databases to determine which roads the vehicle is permissible to drive on.

Clause 9: The system of any preceding clause, wherein the execution component engages a routing component to generate a permissible navigation route for the vehicle based on a determination of suitability for the vehicle to drive on a road.

Clause 10: The system of any preceding clause, wherein a compliance component that determines whether the vehicle is suitable to drive on the road based on registration, permit, or payment status of the vehicle.

Clause 11: The system of any preceding clause, wherein the execution component transmits, in response to a determination that a vehicle is not suitable to drive on a road based on determined restrictions, an electronic notification to an applicable transportation or police authority.

In various cases, any suitable combination or combinations of clauses 1-11 can be implemented.

Clause 12: A computer-implemented method, comprising: determining, by a system operatively coupled to a processor, conditions or restrictions associated with a road; and determining, by the system, suitability for a vehicle to drive on the road based on attributes of tires of the vehicle.

Clause 13: The computer-implemented method of any preceding clause, further comprising actively identifying and interpreting signs on the road.

Clause 14: The computer-implemented method of any preceding clause, further comprising determining, via sensors, if the vehicle is equipped with studded tires or snow chains.

Clause 15: The computer-implemented method of any preceding clause, further comprising determining, via sensors, tread depth of one or more tires of the vehicle.

Clause 16: The computer-implemented method of any preceding clause, further comprising determining what type of stud or snow chain the vehicle is equipped with.

Clause 17: The computer-implemented method of any preceding clause, further comprising displaying an electronic notification on a vehicle display in response to a determination that the vehicle is not suitable to drive on the road.

Clause 18: The computer-implemented method of any preceding clause, further comprising employing GPS data and transportation databases to determine which roads the vehicle is permissible to drive on.

In various cases, any suitable combination or combinations of clauses 12-18 can be implemented.

Clause 19: A computer program product comprising a non-transitory computer-readable memory having program instructions embodied therewith, the program instructions executable by a processor to cause the processor to: determine conditions or restrictions associated with a road; and determine suitability for a vehicle to drive on the road based on attributes of tires of the vehicle.

Clause 20: The computer program product of any preceding clause, wherein the program instructions are further executable to cause the processor to: display an electronic notification on a vehicle display in response to a determination that the vehicle is not suitable to drive on the road.

In various cases, any suitable combination or combinations of clauses 19-20 can be implemented.

In various cases, any suitable combination or combinations of clauses 1-20 can be implemented.

What is claimed is:

1. A system of a vehicle, comprising:
    a memory configured to store computer-executable components; and
    a processor that executes at least one of the computer-executable components that:
        determines a restriction associated with at least one of studded tires or snow chains on a road in a defined geographic region;
        determines, using at least one sensor of the vehicle, that the vehicle has at least one of a studded tire or a snow chain on a tire;
        determines an unsuitability of the vehicle to drive on the road based on the restriction and the at least one of the studded tire or the snow chain on the tire of the vehicle; and
        presents, via a user interface device of the vehicle, a warning that the vehicle is not permitted to drive on the road due to the unsuitability associated with the at least one of the studded tire or the snow chain on the tire of the vehicle.

2. The system of claim 1, wherein the determining the restriction associated with the at least one of studded tires or snow chains on the road comprises:
    identifying, using the at least one sensor, a sign in the defined geographic region that indicates the restriction associated with the at least one of studded tires or snow chains on the road.

3. The system of claim 1, wherein the at least one of the computer-executable components further:
    determines, via the at least one sensor, that studs of the studded tires are metal.

4. The system of claim 3, wherein the determining the unsuitability comprises determining that the restriction bans metal studs on the road.

5. The system of claim 4, wherein the determining the unsuitability further comprises that the restriction bans metal studs on the road during a defined time period the encompasses a current time or an expected time at which the vehicle will be travelling on the road.

6. The system of claim 1, wherein the user interface comprises a vehicle display.

7. The system of claim 1, wherein the determining the unsuitability comprises determining that a current surface condition of the road violates the restriction associated with the at least one of studded tires or snow chains on the road.

8. The system of claim 1, wherein the at least one of the computer-executable components further:
    employs GPS data and transportation databases to determine which roads in the defined geographic region permit the vehicle to drive with the at least one of the studded tire or the snow chain on the tire of the vehicle.

9. The system of claim 1, wherein the at least one of the computer-executable components further:

generates a permissible navigation route in the defined geographic region that permits the vehicle to drive with the at least one of the studded tire or the snow chain on the tire of the vehicle.

10. The system of claim 1, wherein the determining the unsuitability comprises determining that at least one of registration, permit, or payment status of the vehicle violates restriction associated with the at least one of studded tires or snow chains on the road.

11. The system of claim 1, wherein the least one of the computer-executable components further:
in response to determining that the vehicle has driven on the road, transmits an electronic notification to an applicable transportation or police authority.

12. The system of claim 1, wherein the least one of the computer-executable components further:
transmits, through direct or indirect communication, an electronic notification of the restriction associated with road to other vehicles within a defined range of the vehicle.

13. A computer-implemented method, comprising:
determining, by the system of a vehicle, a restriction associated with at least one of studded tires or snow chains on a road in a defined geographic region;
determining, by the system, using at least one sensor of the vehicle, that the vehicle has at least one of a studded tire or a snow chain on a tire;
determining an unsuitability of the vehicle to drive on the road based on the restriction and the at least one of the studded tire or the snow chain on the tire of the vehicle; and
presenting, via a user interface device of the vehicle, a warning that the vehicle is not permitted to drive on the road due to the unsuitability associated with the at least one of the studded tire or the snow chain on the tire of the vehicle.

14. The computer-implemented method of claim 13, wherein the determining the restriction associated with the at least one of studded tires or snow chains on the road comprises:
identifying, using the at least one sensor, a sign in the defined geographic region that indicates the restriction associated with the at least one of studded tires or snow chains on the road.

15. The computer-implemented method of claim 13, further comprising:
determining, via the at least one sensor, that studs of the studded tires are metal.

16. The computer-implemented method of claim 15, further comprising:
determining the unsuitability comprises determining that the restriction bans metal studs on the road.

17. The computer-implemented method of claim 16, wherein the determining the unsuitability further comprises that the restriction bans metal studs on the road during a defined time period the encompasses a current time or an expected time at which the vehicle will be travelling on the road.

18. The computer-implemented method of claim 13, further comprising employing, by the system, GPS data and transportation databases to determine which roads in the defined geographic region permit the vehicle to drive with the at least one of the studded tire or the snow chain on the tire of the vehicle.

19. A computer program product comprising a non-transitory computer-readable medium having program instructions embodied therewith, the program instructions executable by a processor of a vehicle to cause the processor to:
determine a restriction associated with at least one of studded tires or snow chains on a road in a defined geographic region;
determine, using at least one sensor of the vehicle, that the vehicle has at least one of a studded tire or a snow chain on a tire;
determine an unsuitability of the vehicle to drive on the road based on the restriction and the at least one of the studded tire or the snow chain on the tire of the vehicle; and
present, via a user interface device of the vehicle, a warning that the vehicle is not permitted to drive on the road due to the unsuitability associated with the at least one of the studded tire or the snow chain on the tire of the vehicle.

20. The computer program product of claim 19, wherein the determining the restriction associated with the at least one of studded tires or snow chains on the road comprises:
identifying, using the at least one sensor, a sign in the defined geographic region that indicates the restriction associated with the at least one of studded tires or snow chains on the road.

* * * * *